July 6, 1943.  W. H. WOOLF ET AL  2,323,746
PRESSURE-BONDED SEED-WRAPPER AND METHOD OF MAKING SAME
Filed Jan. 26, 1942  2 Sheets-Sheet 2
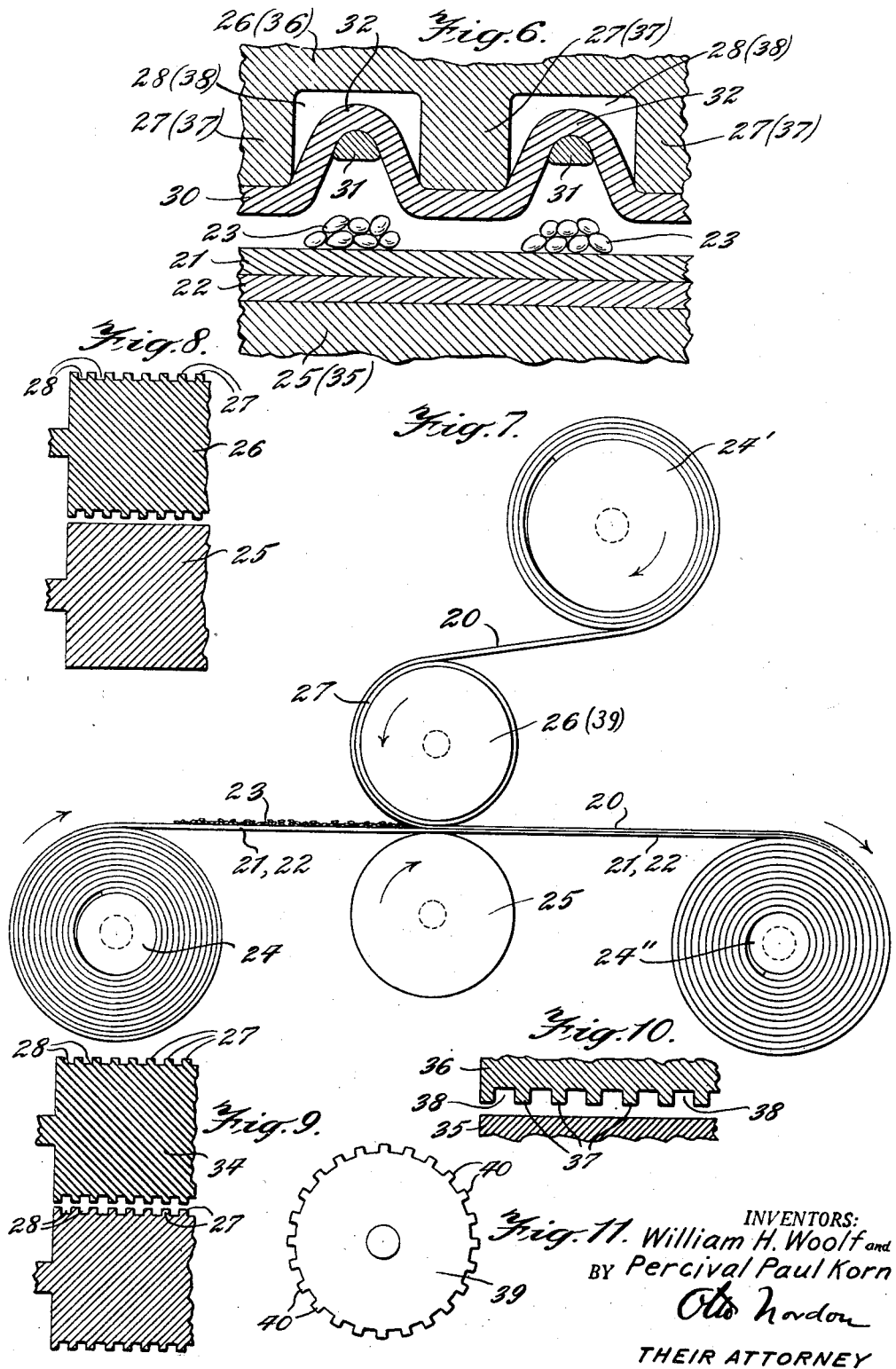
INVENTORS:
William H. Woolf and
BY Percival Paul Korn
THEIR ATTORNEY Patented July 6, 1943

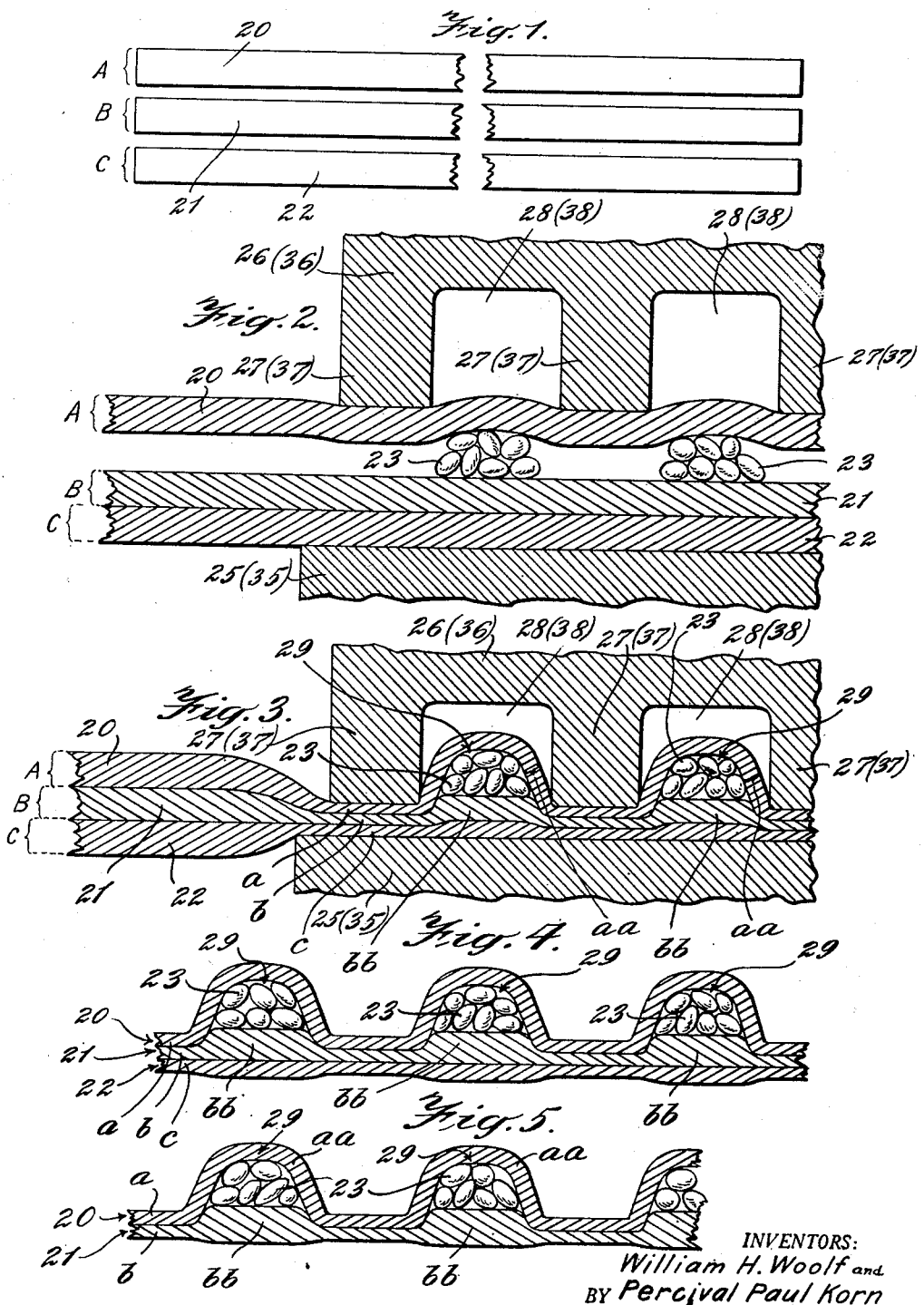

2,323,746

UNITED STATES PATENT OFFICE 2,323,746

PRESSURE-BONDED SEED WRAPPER AND METHOD OF MAKING SAME

William H. Woolf and Percival Paul Korn, New York, N. Y.

Application January 26, 1942, Serial No. 428,316

22 Claims. (Cl. 47—56)

This invention relates to improvements in wrapped seeds and a new method of wrapping seeds.

The present application is a continuation-in-part of our copending application for Patent Ser. No. 374,504, entitled: Process of sowing seeds, with particular reference to the seeding of grass lawns, filed January 15, 1941. Full reference to the disclosure of said copending application is hereby made.

If seeds are scattered on the ground, more or less haphazardly as by sowing, their distribution will be irregular and uneven. Moreover, in unfavorable weather, seeds will be lost: washed away by the rain, blown away by the wind, etc.

Seeds may be planned in regular patterns and protected from the elements by using a carrier to which the seeds adhere. The carrier may consist of a sheet of paper with seeds secured to it, for instance by means of an adhesive. The seeds are planted by spreading the carrier on the ground. However, the use of adhesives involves various manufacturing difficulties and renders the article expensive.

An object of the present invention is to provide a simple and efficient wrapper for seeds.

Another object of the invention is to construct the wrapper without the use of adhesives or special fastening means.

A further object of the invention is to construct the wrapper so that the seeds will be permanently kept in a predetermined pattern.

A still further object of the invention is to provide an inexpensive method of forming the improved seed wrapper.

In brief we accomplish these and other objects of the invention in the following manner:

We provide two sheets of paper having the same width. The seeds to be wrapped are placed in rows on the bottom sheet. The top sheet is then placed on the bottom sheet in undulated form while being simultaneously stretched, in lateral direction, over the seeds. As a result, the lateral edges of the top and bottom sheets coincide, although the stretched top sheet is wider, this excess width being taken up by the undulations of the top sheet. The top and bottom sheets are bonded together by pressure in selected areas, without the use of adhesives or special mechanical fastening means. Due to the stretching the thickness of the top layer about the seeds is reduced and fissures and pores are created which admit air and moisture, a condition of prime importance for the preservation of the seeds. A loose and perforated top cover also permits the shoots of germinating seeds to readily project outside the seed wrapper.

A modification of the invention, suitable for special purposes, uses a top sheet of greater width than that of the bottom sheet. In this construction no stretching occurs and the undulations are preformed and then placed over the rows of seeds, whereupon the top and bottom sheets are matted together.

Our invention is fully described in the following specification and illustrated, by way of example, in the accompanying drawings, in which—

Fig. 1 shows in side-elevation, on an enlarged scale, three sheets of paper, of even width, of which the seed wrapper is formed, parts being broken away;

Fig. 2 illustrates the step of stretching the top sheet of the seed wrapper over the seeds during the assembly of the wrapper;

Fig. 3 illustrates the seed wrapper and seeds, between a pair of rollers or dies, with parts broken away, at the moment of completion of the wrapping operation;

Fig. 4 is a transverse sectional view of a portion of the completed three-layer wrapper containing the seeds;

Fig. 5 is a transverse section of a portion of a two-layer wrapper containing the seeds;

Fig. 6 illustrates a modification of the invention according to which a top sheet of greater width than the bottom sheet is placed over the seeds in preformed undulated condition, parts being broken away;

Fig. 7 is a schematical view of a device for wrapping the seeds according to the present invention;

Fig. 8 is a detail view showing, in longitudinal section, the contour of the rollers used for wrapping the seeds, parts being broken away;

Fig. 9 is a partial longitudinal sectional view of a modified set of rollers;

Fig. 10 is a sectional view of a pair of reciprocating dies, parts of same being broken away;

Fig. 11 is a side elevation of a modified roller having longitudinal corrugations as may be used for wrapping seeds according to the present invention.

In order to facilitate understanding of the invention, it will be generally assumed in the following description that the seed wrapper has rectangular outline and that the seeds are arranged in the rectangular wrapper in parallel longitudinal rows. It should be noted however at the outset, that the seed wrapper may have square, round or any other desired shape, and that the seeds need not be arranged in parallel longitudinal rows but may be laid out obliquely, with or without parallelism, or in any other pattern whatsoever as may suit the fancy of the user.

The seed wrapper may consist of paper or any other suitable material. We have found crepe wadding to be a suitable material. Longitudinally creped wadding permits of some longitudinal stretching while substantially resisting lateral stretching; practically, it cannot be stretched laterally without producing some tears.

Creped wadding is commercially available in form of a continuous web consisting of one or more sheets, the web being rolled up for convenience in handling. Creped wadding is a porous more or less loosely matted, hygroscopic cellulose tissue paper of excellent moisture absorbing quality which disintegrates very rapidly. Instead of longitudinally creped wadding, transversely or otherwise creped wadding may be used in accordance with the present invention. Indeed, instead of wadding, other types of papers, fabrics, webs or other materials may be used. If desired, plant nutrients, fertilizing substances, protectives against pests and the like may be applied to the paper etc. or otherwise incorporated in our new seed wrapper.

According to one form of the invention (Figs. 1 to 4 and 7) the seed wrapper consists of three sheets, to wit: top sheet 20, upper bottom sheet 21 and lower bottom sheet 22. Bottom sheets 21, 22 are superimposed and form to all intents and purposes, a single web, as shown in Fig. 7. Seeds 23 are disposed between top sheet 20 and bottom sheets 21, 22. The lower bottom sheet 22 serves primarily as a reenforcement and may be omitted.

Such a construction is shown in Fig. 5. This seed wrapper consists of but two sheets: a top sheet 20 and one bottom sheet 21, lower bottom sheet 22 being omitted.

It will be clear, however, that instead of using a single top sheet a plurality of top sheets may be combined with either a single or a plurality of bottom sheets.

As shown in Fig. 7, the combined bottom sheets 21, 22 are fed from the mill roll 24 between smooth cylindrical roller 25 and cylindrical roller 26 which is provided with a series of annular corrugations 27 as shown in Figs. 2, 3 and 8. Top sheet 20 is delivered from mill roll 24' and passes under certain pressure over and around corrugated roller 26 and between it and roller 25 to meet bottom sheets 21, 22. Rollers 25, 26 are so adjusted that the corrugations 27 will press top sheet 20 and bottom sheets 21, 22 together at all areas of contact, whereby longitudinal compression lines are created. The pressure exerted by rollers 25, 26 should be uniform across the sheets 20, 21, 22 and such as to tightly interlock the fibres of sheets 20, 21, 22 and pressure-bond the same together.

The interconnected top sheet 20 and bottom sheets 21, 22 thus travel jointly to rewind roll 24''.

Grooves 28 are formed between the corrugations 27 of roller 26, and the rows of seeds 23 are so arranged on bottom sheet 21, 22 that they will travel into grooves 28 (Figs. 2, 3, 6, 7, 8, etc.). Thus, crushing of the seeds 23 by corrugations 27 is avoided.

It should be noted that according to this embodiment of the present invention, top sheet 20 has identically the same width as bottom sheets 21, 22. As shown in Fig. 2 of the drawings, top sheet 20 is first bent over rows of seed 23 and then laterally stretched over the seeds 23 to form the undulations or pockets 29 for seeds 23. In other words, each row of seeds 23 acts as a tool or mandrel over which top sheet 20 is bent and stretched. As a result the thickness of top sheet 20 in the portions forming undulations 29 is reduced and if the material has no lateral or little tensile strength, fissures and pores will be opened up.

As shown in Fig. 1, top sheet 20, upper bottom sheet 21 and lower bottom sheet 22 have the same thicknesses designated, respectively, as A, B and C. In Fig. 2, which illustrates an initial step in the operation of forming the seed wrapper, the thicknesses of the three sheets 20, 21 and 22 are still unchanged. Fig. 3 illustrates the moment of highest pressure on the sheets 20, 21, 22, when the top roller 26 reduces the thicknesses A, B, C of sheets 20, 21, 22 at the points of contact of corrugations 27 to new thicknesses $a, b, c$. In the grooves 28, on the other hand, top sheet 20, is reduced to thickness $aa$, due to the lateral stretching, while upper bottom sheet 21 remains substantially unaffected, and forms an elevated platform $bb$ for each row of seeds 23. When the seed filled wrapper emerges from the position in the press shown in Fig. 3, the lower bottom sheet 22 assumes a somewhat wavy contour (Fig. 4) as a result of the inherent resiliency of the compacted sheets 20, 21, 22 which tend back to their original shapes. In Figs. 2 and 3, sheets 20, 21, 22 are shown as projecting to the left, beyond rollers 25, 26, in order that by this side-by-side comparison the difference in thicknesses A, B, C and $a, b, c$ etc. may be readily appreciated. To facilitate the understanding of the principles of the invention, size and proportions have been exaggerated.

The reduction in thickness of portions $a, b, c$ may of course be varied for instance by changing the amount of pressure applied by rollers 25, 26. The thickness $aa$ of undulations 29 depends for example on the material of which sheet 20 is made, the size, amount and hardness of seeds 23, etc. Thickness $aa$ may thus be made greater or less than thickness $a$. Similarly, thicknesses A, B, C (Fig. 1) need not be alike. These matters merely involve questions of design which may be left to the discretion of the individual operator.

The filled seed wrapper shown in Fig. 5 differs from the article shown in Fig. 4 only in that the lower bottom sheet 22 is omitted. In this case, bottom sheet 21 assumes a slightly wavy contour like lower bottom sheet 22 in Fig. 4.

The modification of the invention illustrated in Fig. 6 differs from the embodiments shown in Figs. 2 and 3 in that the top sheet 30 of the modified form is of a larger width than that of bottom sheets 21, 22. Top sheet 30 is undulated for instance by means of fingers 31 before it is pressure-bonded to the bottom layers 21, 22 by means of rollers or dies 25, 26. The excess width of the top sheet 30 is thus taken up by the undulations 32, so that after sheet 30 is affixed to bottom sheets 21, 22, the lateral edges of the latter coincide with those of top sheet 30. In this modification, no stretching or weakening of the top sheet 30 occurs.

In the embodiments of the invention shown in Figs. 2 and 3, the top and bottom sheets 20, 21, 22 at the start of operation are of the same width. During wrapping of the seeds, top sheet 20 alone is stretched beyond its original width and weakened. Bottom sheets 21, 22 are not stretched.

On the other hand, if rollers 33, 34 as shown in Fig. 9 are used, both the top sheet and the bottom sheet or sheets will be stretched over the interposed seeds. Moreover, if the top and bottom sheets are of a non-tensile nature, in lateral direction, fissures and tears will occur in the top and bottom undulations enclosing the rows of seeds.

Instead of using revolving rollers 25, 26 or 33, 34, etc. it is of course possible to use a pair of reciprocating dies 35, 36 as illustrated for example in Fig. 10. Elements 25, 26 in Figs. 2, 3 and 6 may therefore also be considered to be detail views of a pair of reciprocating horizontal dies such as 35, 36.

Element 35 may represent a flat plate, while plate 36 is provided with corrugations or bosses 37 and grooves 38. Bosses 37 need not be made as continuous corrugations but may form any desired pattern. Bosses 37 produce the compressed areas uniting top and bottom sheets of the seed wrapper. Care should therefore be taken to so arrange the pattern of bosses 37 that, on pressing the sheets, the seeds are surrounded by compressed areas to prevent displacements thereof. It should be noted that, if it is desired to arrange seeds in complicated patterns instead of in simple parallel rows, it will often be simpler to place the bottom sheet on a flat horizontal platen such as 35, form the seed pattern and then have the top sheet secured to the bottom sheet on the downward plunge of the upper die such as 36. In the case of reciprocating dies 35, 36 it will sometimes be necessary to maintain the lateral edges of the top sheet in alignment with those of the bottom sheet to prevent the top sheet edges from moving inwardly to form undulations without stretching, with the result that the top sheet when attached will be of less width than the bottom sheet whose margins will hence be without top cover.

In the construction shown in Fig. 10, instead of using a single grooved plate 36, plate 35 may also be grooved, in correspondence to roller 33 (Fig. 9).

The aforementioned inward movement of the lateral edges of the top sheet is substantially absent in the case of corrugated rollers (Figs. 8, 9) because each corrugation tightly engages the sheets thus preventing inward slip, i. e. receding of the side edges. However, clamping means for preventing inward slip of the top sheet (Fig. 3) or the top and bottom sheets (Fig. 9) may be provided, if desired, to secure perfect lateral alignment. Of course, if stretching of the top sheet is not required or desired, a wider top sheet may be used (as in Fig. 6) whereby in the case of vertically reciprocating dies (Fig. 10), the use of pre-forming fingers 31 may be dispensed with. If an uncovered margin—selvage—is desired, a top sheet may be used which is of less width than that of the bottom sheet.

In order to simplify the description, it has been assumed heretofore that the seeds are arranged in longitudinal rows, more or less parallel to the longitudinal axis of the sheets 20, 21, 22 unwinding from rolls 24, 24', as shown in Fig. 7. When using longitudinal rows of seeds 23, rollers such as 26, 33, 34, provided with peripheral annular corrugations 27 may be used to advantage. Instead of the latter, these rollers could be provided with axial or helicoid corrugations as illustrated for example in Fig. 11. Roller 39, shown in Fig. 11, is provided with corrugations or bosses 40. Roller 39 may be used as a top roller in conjunction with a correspondingly corrugated bottom roller or a smooth bottom roller. It will be obvious, that the use of roller 39 requires a different method of feeding the seeds from that applicable in case of annularly corrugated rollers 26, 33, 34. This also holds true with respect to flat dies 35, 36. However, the method of feeding the seeds to different wrapping devices does not form part of the present patent application.

Matting together of the sheets of the seed wrapper may be accomplished, if desired, by means of heated rollers or dies. Similarly, the sheets may be pressure-bonded together in moist (steamed) or wet form etc. with or without the use of heated rollers or dies.

Some of the outstanding features of the present invention are: forming the top and bottom layer of the seed wrapper of sheets of equal width and stretching the top sheet over the seeds to extend it laterally while forming undulations with the excess width; these undulations being simultaneously weakened due to the lateral stretching; producing a pressure-bonded seed wrapper containing the seeds.

Roller 39 may be inserted for instance in the arrangement illustrated in Fig. 7 in place of top roller 26. In that event, top sheet 30 fed from mill roll 24' is stretched longitudinally, as it unwinds upon the top roller 39 in order to produce weakened transverse undulations. This stretching may be produced by connecting rollers 39, 25 to a source of power and letting them pull the top sheet 20 from the mill roll 24'. By facilitating or impeding the rotation of mill roll 24', the amount of stretch may be controlled.

Even when using rollers 25, 26, as shown in Fig. 7, we prefer to deliver top sheet 20 in taut condition onto the corrugated roller 26 in order to slightly pre-stretch the sheet 20 over corrugations 27. This result is accomplished by means of a power drive (not shown) which actuates rewind roll 24'' and rollers 25, 26. Rolls 24, 24', on the other hand are not power driven. The pull exerted by rollers 25, 26 and rewind roll 24'' on top sheet 20 and bottom sheets 21, 22 respectively, maintains these sheets in taut condition. If the pull on sheets 20, 21, 22 is too great, rotation of rollers 24, 24' may be eased, if need be, by means of an auxiliary power drive.

The new seed wrapper according to the present invention is eminently suitable for planting lawns. But besides grass seeds, seeds of flowers and other plants may be easily and effectively planted and grown with the aid of our wrapped seeds.

We are aware of the fact that many changes may be made in the details of our new article and method without departing from the scope and spirit of our invention. Thus in this specification, expressions such as "top sheet," "bottom sheets," the "width of the sheet," "longitudinal rows of seeds," etc. have been used. These terms were used to avoid confustion in definition and not in a limiting sense. Indeed, by reversing the article, a top sheet will become a bottom sheet and vice versa. Similarly, by shortening a rectangular seed wrapper, its length will become its width, etc. We therefore do not intend to be limited to the details of construction shown and described herein.

We claim:

1. As an article of manufacture, a wrapper, seeds disposed within said wrapper in seed areas, said seeds being covered by said wrapper, the portions of the latter covering said seeds in said seed areas being distended and stretched, relative to the remaining portions of said wrapper.

2. As an article of manufacture, a wrapper comprising a first sheet, a second sheet, seeds disposed between said sheets in seed areas, the portions of the first sheet covering said seeds in said seed areas being distended and stretched, relative to the remaining portions of said first sheet, said remaining portions of the first sheet being pressure-bonded to said second sheet.

3. As an article of manufacture, a wrapper comprising a first sheet, a second sheet, seeds disposed between said sheets in seed areas, the portions of the first sheet covering said seeds in said seed areas being distended and stretched relative to the remaining portions of said first sheet, and the portions of the second sheet covering said seeds in said seed areas being distended and stretched relative to the remaining portions of said second sheet, said remaining portions of both said first and second sheet being pressure-bonded together.

4. As an article of manufacture, a first sheet, a second sheet, seeds disposed between said sheets in a longitudinal pattern, said first sheet being longitudinally corrugated, said seeds being disposed in said corrugations, the portions of said first sheet forming said corrugations being distended relative to the remaining portions of said first sheet, said remaining portions being pressure-bonded to said second sheet.

5. The article claimed in claim 4, in which said second sheet consists of two layers.

6. The article claimed in claim 4, in which said sheets consist of cellulose wadding.

7. The article claimed in claim 4, in which said sheets consist of creped wadding, and said sheets are longitudinally slightly stretchable.

8. The article claimed in claim 4, in which said bottom sheet consists of two layers, the said sheets consisting of longitudinally creped cellulose wadding, said sheets being longitudinally slightly stretchable and substantially unstretchable in transverse direction, and said corrugations having minute ruptures.

9. A seed wrapper comprising a bottom layer and a top layer of cellulose wadding, longitudinal rows of seeds movably disposed on the bottom layer, the top layer being disposed on the bottom layer and forming longitudinal undulations, said undulated top layer being laterally co-extensive with the bottom layer, said top layer being disposed on the bottom layer in laterally stretched condition, said undulations consisting of the excess width produced by the stretching, said top layer having a reduced thickness and being provided with fissures, as a result of the stretched condition thereof, the "hill" portions of the top layer enclosing the rows of seeds, and the "dale" portions of the top layer being pressure-bonded to the bottom layer, whereby said fissured top layer admits air to said seeds.

10. A seed wrapper comprising a bottom layer of cellulose wadding of predetermined width, a plurality of longitudinal rows of seeds disposed on the bottom layer, a top layer of cellulose wadding of a width in excess of that of the bottom layer, said top layer being disposed in undulated form upon the bottom layer, said layers having the same width in superimposed position, the undulations of the top layer taking up the excess width of the same, the "hill" portions of the top layer enclosing the rows of seeds, and the "dale" portions of the top layer being pressure-bonded to the bottom layer.

11. Method of producing a seed wrapper which consists in providing a bottom sheet of predetermined width, disposing seeds on said bottom sheet in parallel longitudinal rows, superimposing a top sheet on said bottom sheet having the same width as the latter, stretching said top sheet over said seeds to increase the width and decrease the thickness and strength of said top sheet, forming longitudinal undulations with the increased width of said top sheet, the "hill" portions of said undulations enclosing said rows of seed, and pressing the "dale" portions of said undulations upon said bottom sheet to pressure-bond the same together.

12. Method of producing a seed wrapper, which consists in providing a bottom sheet of cellulose wadding, disposing seeds upon said bottom sheet in predetermined seed areas, placing a top sheet of cellulose wadding upon said bottom sheet to cover said seeds, and applying pressure to said top and bottom sheets, except in said seed areas, to mat and bond said sheets together.

13. Method of producing a seed wrapper, which consists in providing a bottom sheet of cellulose wadding, disposing seeds upon said bottom sheet in predetermined seed areas, placing a top sheet of cellulose wadding upon said bottom sheet, maintaining the width of both said sheets and stretching and distending the same over the seeds while simultaneously pressing said sheets together in the portions outside said seed areas, whereby both said sheets are reduced in thickness and weakened in the portions covering the seeds in said seed areas.

14. As an article of manufacture, a wrapper comprising a first sheet, solid bodies disposed on said first sheet in predetermined areas, a second sheet disposed upon said first sheet and covering said bodies in said predetermined areas, the portions of said second sheet covering said bodies in said predetermined areas being stretched over said bodies and distended relative to the remaining portions of said second sheet, said remaining portions of said second sheet being pressure-bonded to said first sheet except in said predetermined areas.

15. The article claimed in claim 4, in which the seed supporting areas of said second sheet form an elevated platform with respect to the remaining portions of said second sheet which portions are pressure-bonded to said first sheet and reduced in thickness as compared to said seed supporting areas.

16. A seed carrier comprising a lower sheet of paper having a substantially flat bottom surface, a plurality of parallel platforms provided on the top surface of said lower sheet, said platforms being separated by compressed areas of reduced thickness, seeds disposed upon said platforms, and an upper sheet of paper superimposed upon said lower sheet, the portions of said upper sheet covering said seeds being stretched and distended and of reduced thickness as compared to the unstretched state of the upper sheet, and the portions of said upper sheet covering said compressed areas being compressed and of reduced thickness, said compressed areas of said upper and lower sheets being matted together, whereby said seed wrapper is weakened and strengthened in selected areas and held together by pressure bonding of said sheets without adhesive.

17. The article claimed in claim 16, in which said upper and lower sheets consists of cellulose wadding.

18. As a new article of manufacture, a seed wrapper comprising a lower sheet of paper provided with spaced apart raised platforms, seeds disposed on said platforms, an upper sheet of paper superimposed upon said lower sheet, said upper sheet covering said seeds in stretched and distended condition, the portions of said upper sheet covering said seeds being of reduced thickness and strength as compared to the unstretched state thereof, the portions of said lower sheet between said platforms being matted to the opposing portions of said upper sheet.

19. The article claimed in claim 18, in which said upper and lower sheets consist of cellulose wadding.

20. A wrapper for miscellaneous articles comprising a lower sheet of paper consisting of a plurality of layers, the bottom surface of said lower sheet, apart from a slight waviness, being perfectly flat, the top layer of said lower sheet forming a plurality of raised spaced apart platforms, the portions of said top layer between said platforms being compressed and pressed into the remaining layers of said lower sheet, said compressed portions causing said waviness of the bottom surface of said lower sheet, articles supported on said platforms, an upper sheet of paper superimposed upon the top layer of said lower sheet, the articles covering portions of said upper sheet being stretched, distended and of reduced thickness as compared to the unstretched state of said upper sheet, said article-covering portions of the upper sheet forming raised pockets of weakened structure, said articles being enclosed between said pockets and said platforms, the portions of said upper sheet between said pockets being compressed and of reduced thickness and being pressed together with the compressed portions of said lower sheet, whereby a paper wrapper with selected weakened and compressed re-inforced portions is produced without the use of an adhesive.

21. The article claimed in claim 20, in which said upper and lower sheets consist of cellulose wadding.

22. A wrapper for seed or other articles, comprising a lower sheet having a substantially flat bottom surface, a raised top portion and a compressed area adjacent said raised top portion, said seed etc. being disposed on said raised portion, an upper sheet superimposed upon said lower sheet, the portions of said upper sheet covering said seeds etc. being stretched, distended and of reduced thickness as compared to the unstretched state of the upper sheet, and the portion of the upper sheet covering said compressed area of said lower sheet being compressed and of reduced thickness, said compressed areas of said upper and lower sheets being pressed and matted together, whereby a selectively weakened and re-inforced wrapper is produced without adhesive.

WILLIAM H. WOOLF.
PERCIVAL PAUL KORN.